United States Patent
Markey et al.

(10) Patent No.: US 10,943,056 B1
(45) Date of Patent: Mar. 9, 2021

(54) SYSTEM AND METHOD FOR IDENTIFYING LOCATION OF CONTENT WITHIN AN ELECTRONIC DOCUMENT

(71) Applicant: RELATIVITY ODA LLC, Chicago, IL (US)

(72) Inventors: Douglas Markey, Western Springs, IL (US); Karl Knoernschild, La Grange, IL (US); Joseph Keslin, Munster, IN (US); Philip Boutros, Chicago, IL (US)

(73) Assignee: RELATIVITY ODA LLC, Chicago, IL (US)

( * ) Notice: Subject to any disclaimer, the term of this patent is extended or adjusted under 35 U.S.C. 154(b) by 9 days.

(21) Appl. No.: 16/390,110

(22) Filed: Apr. 22, 2019

(51) Int. Cl.
*G06F 40/117* (2020.01)
*G06Q 50/18* (2012.01)

(52) U.S. Cl.
CPC ........... *G06F 40/117* (2020.01); *G06Q 50/18* (2013.01)

(58) Field of Classification Search
None
See application file for complete search history.

(56) References Cited

U.S. PATENT DOCUMENTS

| | | | |
|---|---|---|---|
| 5,778,361 A | 7/1998 | Nanjo et al. | |
| 8,131,730 B2 | 3/2012 | Hajela et al. | |
| 8,200,617 B2 | 6/2012 | Spivack et al. | |
| 8,418,055 B2 | 4/2013 | King et al. | |
| 8,763,919 B1 | 7/2014 | Washington | |
| 2005/0108189 A1* | 5/2005 | Samsonov | G06F 16/2228 |
| 2009/0150906 A1* | 6/2009 | Schmidt | G06Q 50/18 |
| | | | 719/317 |
| 2010/0306273 A1* | 12/2010 | Branigan | G06F 16/81 |
| | | | 707/802 |
| 2011/0047156 A1 | 2/2011 | Knight et al. | |
| 2012/0330944 A1* | 12/2012 | Vailaya | G06F 16/245 |
| | | | 707/723 |
| 2014/0032529 A1 | 1/2014 | Chang | |
| 2016/0232143 A1* | 8/2016 | Fickenscher | G06F 40/20 |
| 2016/0275180 A1* | 9/2016 | Matskevich | G06F 16/3344 |
| 2016/0328470 A1* | 11/2016 | Indeck | G06F 16/353 |
| 2017/0364594 A1* | 12/2017 | Chen | G06F 16/2228 |
| 2018/0349332 A1* | 12/2018 | Indenbom | G06F 40/117 |

OTHER PUBLICATIONS

Gerald Salton. Automatic text indexing using complex identifiers. In Proceedings of the ACM conference on Document processing systems (DOCPROCS '88). Association for Computing Machinery, New York, NY, USA, 135-144. (Year: 2000).*

(Continued)

*Primary Examiner* — Howard Cortes
(74) *Attorney, Agent, or Firm* — Marshall, Gerstein & Borun LLP; Randall G. Rueth

(57) ABSTRACT

Techniques are described relating to the identification of location of content within an electronic document. Techniques may include generating a location identification rule specifying one or more parameters for identifying a location identifier (LID) for each of the one or more streams associated with the content of the electronic document. Further, the LID may be generated in accordance with the location identification rule. The LID may be assigned to at least a portion of the content, such that the portion of the content within the electronic document may be located in accordance with the LID.

20 Claims, 5 Drawing Sheets

(56) References Cited

OTHER PUBLICATIONS

Deepavali Bhagwat, Kave Eshghi, and Pankaj Mehra. Content-based document routing and index partitioning for scalable similarity-based searches in a large corpus. In Proceedings of the 13th ACM SIGKDD international conference on Knowledge discovery and data mining (KDD '07). Association for Comput (Year: 2007).*

* cited by examiner

SYSTEM AND METHOD FOR IDENTIFYING LOCATION OF CONTENT WITHIN AN ELECTRONIC DOCUMENT

FIELD OF THE DISCLOSURE

The present disclosure generally relates to electronic document processing and, more specifically, to processing techniques for efficiently determining a location of content within an electronic document.

BACKGROUND

In various applications, a need exists to extract meaningful information from a corpus of electronic documents. In the eDiscovery process commonly associated with litigation, for example, attorneys are commonly provided a voluminous corpus of electronic documents that conform to the discovery request. Analyzing each and every electronic document is a time consuming process.

An example of analyzing an electronic document includes identifying and redacting particular content within the electronic document. Automating such a process can save many hours of attorney time. Conventionally, to locate particular content, such as a character (e.g., letter, number, etc.) of a word within an electronic document, a conventional process carried out by a computing system utilizes a filtering process and a redaction process. The filtering process is configured to identify the uniqueness of a character based on its actual character count relative to the beginning of the electronic document. For example, if the electronic document includes the text "April" at the beginning of a Microsoft® Word document, such as at the header, the character "A" may be assigned an identifier of "1" because the filtering process is configured to recognize the header and the first character in the header. Similarly, the characters "p," "r," "i," and "l" may be assigned identifiers of "2," "3," "4," and "5," respectively. The redaction process, to redact "il" from "April" must be equipped with the same exact filtering mechanism as configured in the filtering process. That is, the redaction process must first recognize the header of the Microsoft® Word document as including text, begin counting characters from the header, and in this example, search for identifiers "4" and "5" to redact "i" and "l."

One drawback of using actual character counts for identifying characters is that any subsequent process (e.g., the redaction process described above, a searching process, a highlighting process, etc.) that utilizes the unique identifier obtained by the filtering process for further processing must use the same exact filtering mechanism as that of the filtering process, or else the conventional approach fails. For instance, had the redaction process in the example above not recognized the header of the Microsoft® Word document and began counting characters from the body of the Microsoft® Word document, the redaction process may redact characters other than "i" and "l" in response to searching for identifiers "4" and "5," such as the $4^{th}$ and $5^{th}$ characters of the body of the Microsoft® Word document. Further, assuming the redaction process is configured to recognize a header, had the redaction process started counting characters from "0" rather than "1," the redaction process may redact the character "l" in response to searching for identifier "4," rather than redact the character "i" corresponding to identifier "4" as expected by the filtering process.

A further drawback of using actual character counts for identifying characters is that, even if both processes use the same exact filtering mechanism, different versions of the same underlying filtering mechanism may result in actual character count differences due to upgraded features or defect fixes within either the filtering process or the redaction process, which may purposefully or inadvertently change the underlying filtering mechanism in subsequent versions. For instance, the example of the redaction process described above may have, in an earlier version, recognized the header of the Microsoft® Word document and began counting characters from the header of the Microsoft® Word document, but in a subsequent version, recognize the header of the Microsoft® Word document yet begin counting characters from the body of the Microsoft® Word document, thereby skipping the header of the Microsoft® Word document. The drawback is exacerbated when actual character counts persist for later use, as is often the case particularly when a subsequent version of a redaction process uses actual character counts identified by an older version.

While each individual electronic document may be relatively small, it is not uncommon for a corpus to include over 100,000,000 electronic documents. As a result, there is a need to provide a solution to the aforementioned problems, with innovative processing techniques that can more robustly, accurately, and/or quickly identify a location of content across a plurality of processes (e.g., a filtering process and a redaction process) or routines, thereby improving the functionality of the computing system itself.

BRIEF SUMMARY

In one aspect, a method for identifying a location of content within an electronic document is provided. The method may be implemented by one or more processors of a computing system. The method may comprise (1) receiving, by one or more processors, the electronic document comprising one or more streams, wherein each of the one or more streams is designated with a stream descriptor defined in a file format of the electronic document independent of content items contained in the one or more streams within the electronic document; (2) generating, by the one or more processors, a location identification rule specifying one or more parameters for identifying a location identifier (LID) based on the stream descriptor for each of the content items contained in the one or more streams; (3) generating, by the one or more processors, the LID in accordance with the location identification rule, wherein the location identifier or the location identification rule is sharable with a second routine; (4) assigning, by the one or more processors, the LID to at least one of the plurality of content items contained in the one or more streams within the electronic document; and (5) locating, by the one or more processors via the first routine or the second routine, the at least one of the plurality of content items based on the LID.

In another aspect, a system for identifying a location of content within an electronic document is provided. The system may comprise a computing device comprising one or more processors and a memory. The memory may store non-transitory, computer-readable instructions that, when executed by the one or more processors, cause the computing device to process the electronic document to identify a location of content within the electronic document. The system may process the electronic document by (1) receiving, by one or more processors, the electronic document comprising one or more streams, wherein each of the one or more streams is designated with a stream descriptor defined in a file format of the electronic document independent of content items contained in the one or more streams within the electronic document; (2) generating, by the one or more processors, a location identification rule specifying one or more parameters for identifying a location identifier (LID) based on the stream descriptor for each of the content items contained in the one or more streams; (3) generating, by the one or more processors, the LID in accordance with the location identification rule, wherein the location identifier or the location identification rule is sharable with a second routine; (4) assigning, by the one or more processors, the LID to at least one of the plurality of content items contained in the one or more streams within the electronic document; and (5) locating, by the one or more processors via the first routine or the second routine, the at least one of the plurality of content items based on the LID.

In another aspect, a non-transitory computer-readable storage medium storing processor-executable instructions is provided. The instructions, when executed, cause one or more processors to (1) receive the electronic document comprising one or more streams, wherein each of the one or more streams is designated with a stream descriptor defined in a file format of the electronic document independent of content items contained in the one or more streams within the electronic document; (2) generate a location identification rule specifying one or more parameters for identifying a location identifier (LID) based on the stream descriptor for each of the content items contained in the one or more streams; (3) generate the LID in accordance with the location identification rule, wherein the location identifier or the location identification rule is sharable with a second routine; (4) assign the LID to at least one of the plurality of content items contained in the one or more streams within the electronic document, and (5) locate via the first routine or the second routine the at least one of the plurality of content items based on the LID.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

I. Overview

Figure 1:
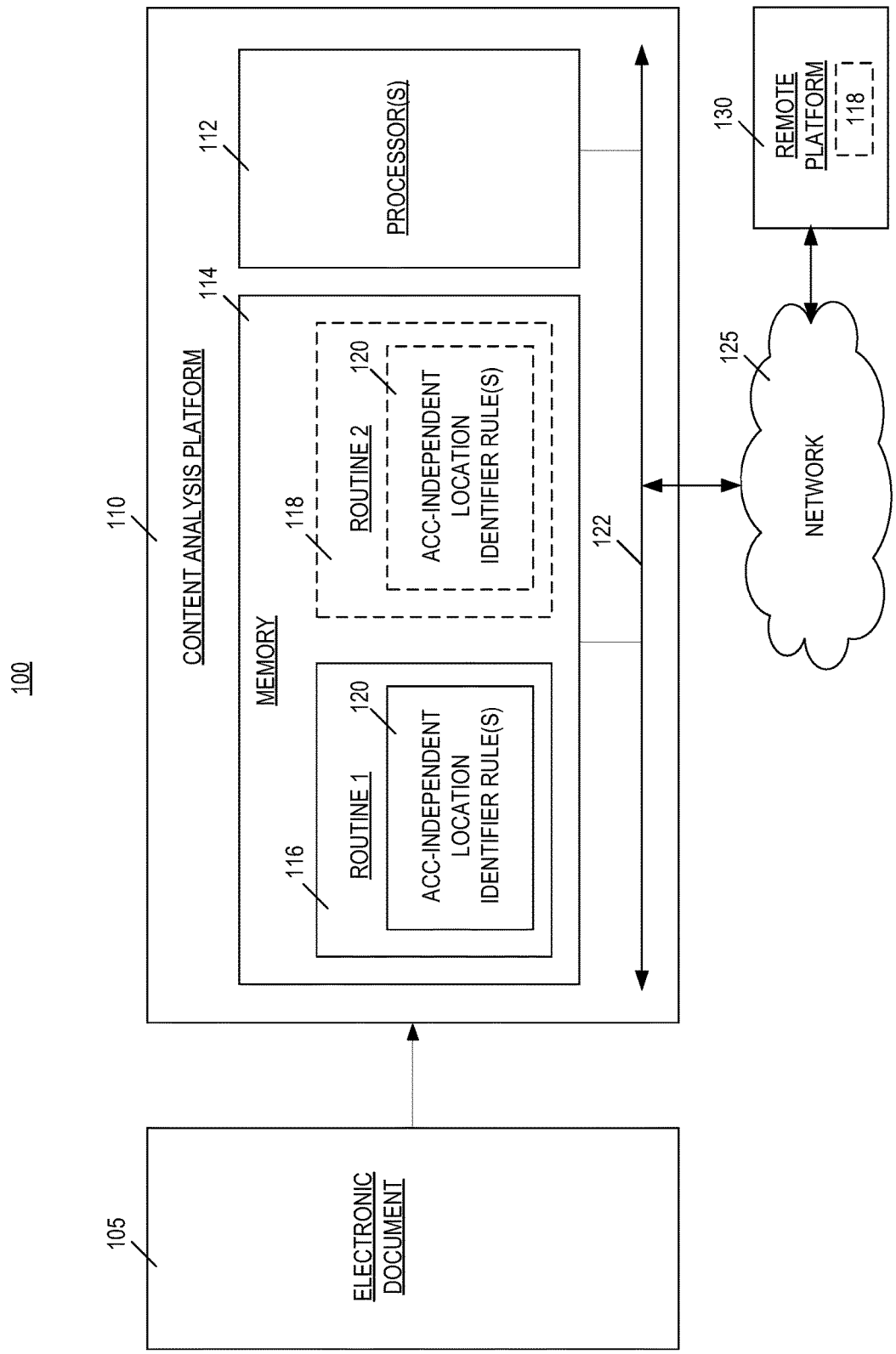
FIG. 1 depicts an example computer system in which the techniques described herein may be implemented, according to one embodiment, according to one embodiment.

The embodiments described herein relate to, inter alia, the identification of content within one or more electronic documents. The systems and techniques described herein may be used, for example, to prepare the corpus of electronic documents for ingestion into a tool or platform of the sort commonly used during litigation. Although the present disclosure generally describes the techniques' application to the eDiscovery and/or litigation context, other applications are also possible. For example, the systems and techniques described herein may be used by a company or other entity to categorize and/or review its own archived electronic documents and/or for other purposes.

As it is generally used herein, an "electronic document" refers to any electronic media content (other than computer programs or system files) that are intended to be used in either an electronic form or as printed output. While many of the examples described herein refer to a Microsoft® Word document supported by the Microsoft® Office platform for ease of illustration, it should be appreciated that the techniques described herein are applicable to other forms of electronic documents (e.g., emails, text messages, etc.) and other platforms. As another example, the Adobe® platform may support its own form of electronic documents (e.g., an Adobe® PDF document).

As it is generally used herein, "file format" refers to a particular format that underlies an electronic document. While many of the examples of file formats described herein refer to an Office Open XML (Extensible Markup Language) format that underlies a Microsoft® Word document (i.e., electronic document having the extension ".docx") supported by the Microsoft® Office platform for ease of illustration, it should be appreciated that the techniques described herein are applicable to other formats that underlie electronic documents (e.g., emails, text messages, etc.) and platforms, such as a Compound File Binary (CFB) file format, ZIP container format, Portable Document Format (PDF) file format, etc.

Generally, each file format defined by designers of the file format is organized as a hierarchical structure consisting of a set of streams, where each stream, designated with a stream descriptor, contains a sequence of bytes that can be read from or written to by a routine or application. An electronic document may begin with a root stream. When the electronic document is further populated with additional data (e.g., text, embedded objects or files such as images, videos, text boxes, etc.), the additional data may be represented as additional streams that are nested within the root stream of the electronic document according to the particular file format defined by designers of the electronic document. Accordingly, the electronic document may be considered a multi-stream electronic document: a root stream and nested streams comprising the additional data. The streams may also be compressed, encrypted, or otherwise encoded. The electronic document may generally continue to be established in this manner so that each new data adds another nested stream to the generated electronic document. When the electronic document ends, the electronic document may include an end stream.

As described above, in some embodiments, an electronic document may include embedded objects. As is known, Object Linking and Embedding (OLE) is a technology developed by Microsoft® that allows a routine or application to export an object to another routine or application, which in turn imports the object into an electronic document. An example of a structure of the electronic document generated by using OLE technology is called a Microsoft Compound File Binary (CFB) file format, which defines a single electronic document as a hierarchical collection of streams and embedded objects. For example, a Microsoft®

Excel application may export a Microsoft® Excel table object to a Microsoft® Word application, which in turn imports the Microsoft® Excel table object into a Microsoft® Word document, which may further include text. In doing so, the structure of the electronic document that organizes a hierarchical collection of streams and embedded objects may be updated to include the imported table object.

Of course, a Microsoft® Excel table is just one non-limiting example of an embedded object within an electronic document. As other examples, an electronic document may include other Office binary embedded objects (e.g., a Microsoft® PowerPoint object), Adobe® PDF (Portable Document Format) embedded objects, and/or Office XML embedded object (i.e., zip entries), to name a few. In such embodiments, each embedded object may be viewed as a separate "context level" from the native electronic document. For example, a Microsoft® Word document having an embedded Microsoft® Excel table object may have at least two distinct independent context levels: a context level for the native Microsoft® Word document, and another context level for the embedded Microsoft® Excel table object. However, despite the electronic document having at least two distinct independent context levels, the single structure of the electronic document maintains its hierarchical collection of streams and embedded objects, starting from the root stream.

According to aspects, a first routine or process may be configured to analyze and/or index the electronic document by (1) generating a location identification rule specifying one or more parameters for identifying a location identifier (LID) for each of the one or more streams associated with the content of the electronic document; and (2) generating the LID according to the location identification rule. One of the parameters may be used to specify how to identify a stream descriptor corresponding to one or more streams associated with the content of the electronic document. A stream identifier may be derived from an output of a hash function of the stream descriptor, and it is this stream identifier that may be used as the LID for content located at a particular stream corresponding to the stream descriptor of the electronic document. In some embodiments, the LID may also include an offset identifier upended to the stream identifier to identify a particular content item within the stream corresponding to the stream descriptor of the electronic document. By identifying stream descriptors in the file format rather than identifying actual character counts (ACCs) in the electronic document to determine a LID for content, the embodiments of the present disclosure advantageously eliminate the problem of locating content based on inconsistent ACCs that persist for later use, as described above.

Further, by generating a location identification rule to determine LIDs, the embodiments of the present disclosure enable the first routine or process to disseminate the location identification rule, or the LIDs determined from the location identification rule, to a second routine or process (e.g., a redaction routine) so that the second routine or process may either determine LIDs on its own without assistance from the first routine or process using the location identification rule, or recognize and properly interpret the LIDs determined by the first routine or process. That is, the LID or the location identification rule is sharable with a second routine. Therefore, and advantageously, embodiments of the present disclosure do not require usage of the same exact filtering mechanism between at least two routines or processes (which are often programmed using identical code or at least using the same coding language, such as C#, C++, etc.), as described above, and instead, enable at least two routines or processes (even processes programmed using different code or coding languages) to have access to a common location identification rule or algorithm for generating, recognizing, and/or interpreting LIDs. In other words, embodiments of the present disclosure enable at least two routines or processes to generate, recognize, and/or interpret LIDs corresponding to content within an electronic document according to shared documentation describing how to uniquely describe the locations of content in the electronic document by way of LIDs.

II. Example Environment for Generating Lids for an Electronic Document

FIG. 1 depicts an example environment 100 in which an electronic document 105 is prepared for analysis via a content analysis platform 110, according to one embodiment. The content analysis platform 110, and any other platform described herein, may include a computing device, such as a personal computer (e.g., desktop computer, laptop), smartphone, tablet, server, or other suitable computing device. Components of the computing device may include, but are not limited to, a processing unit (e.g., processor(s) 112), a system memory (e.g., memory 114), and a system bus 122 that couples various system components including the memory 114 to the processor(s) 112. In some embodiments, the processor(s) 112 may include one or more parallel processing units capable of processing data in parallel with one another. The system bus 122 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). Although not shown, other system components communicatively coupled to the system bus 122 may include input devices such as cursor control device (e.g., a mouse, trackball, touch pad, etc.) and keyboard (not shown). A monitor or other type of display device may also be connected to the system bus 122 via an interface, such as a video interface. In addition to the monitor, computers may also include other peripheral output devices such as a printer, which may be connected through an output peripheral interface (not shown).

The memory 114 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines (e.g., routines 116, 118), data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 112 of the computing device.

The content analysis platform 110 may operate in a networked environment and communicate with one or more remote platforms, such as a remote platform 130, via network 125, such as a local area network (LAN), a wide area network (WAN), or other suitable network. The platform 130 may be a personal computer (e.g., desktop computer, laptop), smartphone, tablet, server, or other suitable computing device, and may include many or all of the elements described above relative to the platform 110. In some embodiments, as will be described herein, the routine 118 as will be further described herein may be stored and executed by the remote platform 130 instead of by the platform 110.

It should also be understood that although only one electronic document 105 is shown, the example environment 100 may be configured to analyze a corpus of electronic documents. In an embodiment, the electronic document 105 may include an electronic document (e.g., Microsoft® Word document, email) for a company or organization that complies with a discovery request. The electronic document 105 may be ingested into a platform 110 in a manner that facilitates efficient analysis via the content analysis platform 110. The electronic document 105 may be ingested into the platform 110 by executing a computer program (e.g., routine 116) on a computing device that has access to the environment 100. According to aspects, the routine 116 may provide an instruction to the platform 110 as to a location at which the electronic document 105 is stored. Using this location, the routine 116 may then be able to access the electronic document 105 for performing the content location identification techniques described herein.

Generally, the techniques for identifying a location of content within the electronic document 105 may be implemented in part or in their entirety within an environment such as environment 100 illustrated in FIG. 1. The environment 100 may be configured to identify a location of content within the electronic document 105. Moreover, the electronic document 105 of FIG. 1 may be stored in memory (e.g., memory 114) as program data in a hard disk drive, magnetic disk and/or optical disk drive in platform 110 and/or remote platform 130. In some embodiments, the platform 110 may be dedicated to identifying the location of desired content within the electronic document 105 and communicating descriptions of the locations (i.e., location identifiers) to the remote platform 130. The remote platform 130 may be a client device that is used to access user-facing features for marking up (e.g., redacting or highlighting desired content within the electronic document) the electronic document 105 by using the location identifiers to search for the desired content.

Particularly, the memory 114 of platform 110 may store routine (e.g., routines 116, 118) or applications that, when executed by processor 112, cause processor 112 to uniquely identify content ranging from a piece of text (e.g., character) to an entire embedded object for subsequent mark-up (e.g., highlighting, redacting, etc.). For example, a first routine or application 116 may be configured to index content of the electronic document 105 by capturing the location of the desired content as a LID, and pass the LID corresponding to the content to a second routine or application 118, which in turn may redact or highlight a desired portion of the content by using the location identifier to search for the desired portion. For the second routine or application 118 to recognize the LID of the content received from the first routine or application 116, the second routine or application 118 may be configured with a location identification rule 120, which is the same rule used by the first routine or application 116 in generating the unique LID for each character, word, and/or embedded object of the electronic document 105. As will be described herein, the location identification rule 120 does not use the actual character count (ACC) of the content within the electronic document 105 to generate the LID. Rather, the location identification rule 120, inter alia, identifies stream descriptors in the file format corresponding to the electronic document 105 that are independent of the content contained within the electronic document 105, and subsequently processes the identified stream descriptors (e.g., via a hashing function) to generate the LID. Accordingly, the location identification rule 120 may be considered an ACC-independent location identification rule.

According to aspects, the platform 110, via first routine or application 116 or another dedicated routine or application (e.g., second routine 118), may generate the location identification rule 120 specifying one or more parameters for identifying a stream descriptor corresponding to one or more streams associated with the content of the electronic document 105. In some embodiments, the location identification rule 120 may specify a plurality of parameters corresponding to a plurality of different file formats. In other embodiments, the platform 110 may generate a plurality of location identification rules 120, each dedicated for specifying one or more parameters corresponding to a particular file format.

Figure 2:
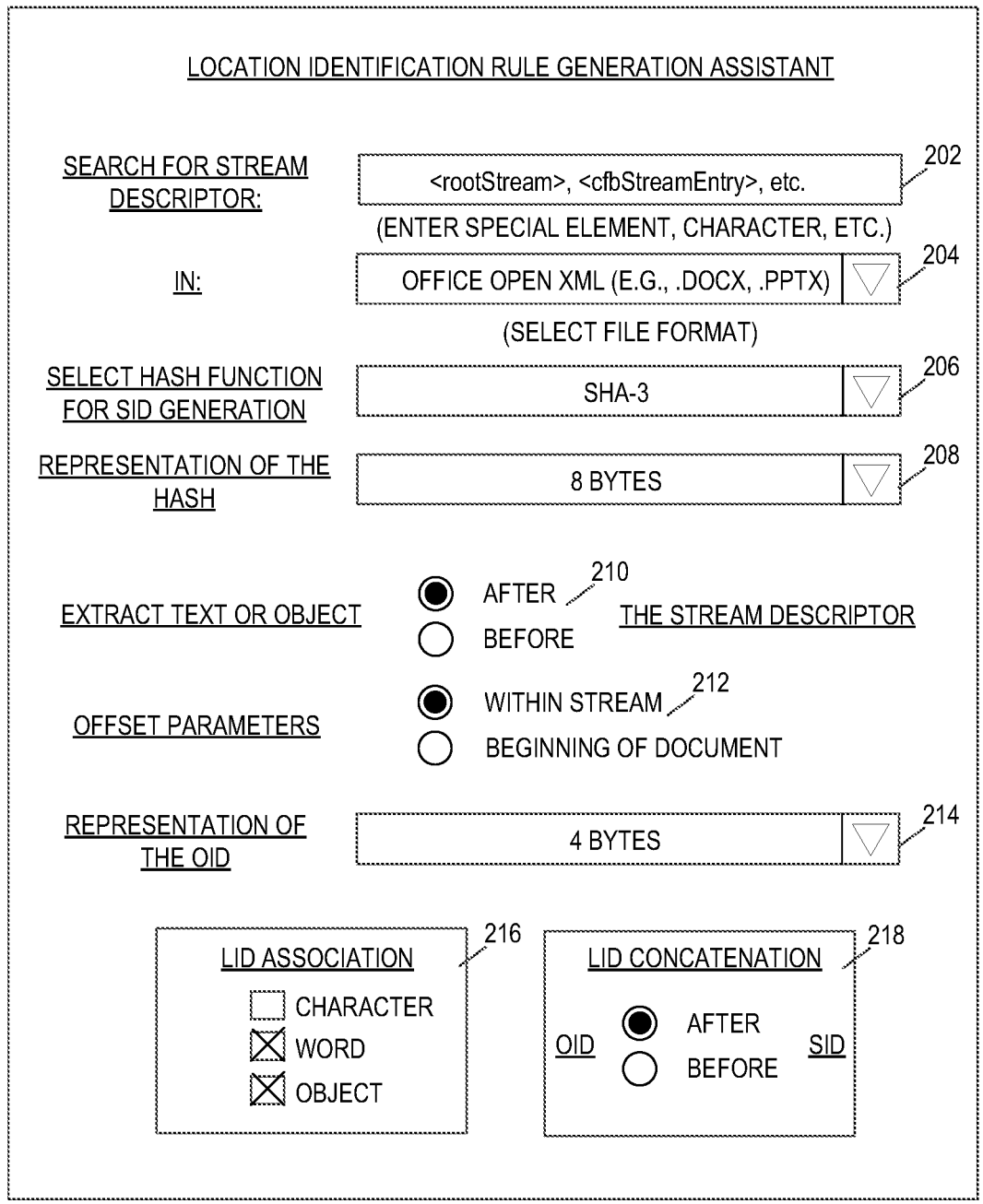
FIG. 2 depicts an example user interface for generating location identification rules, according to one embodiment and scenario.

With concurrent reference to FIG. 2, a user may interact with a graphical user interface, such as the location identification rule generation assistant 200 stored in memory 114, to generate the location identification rule 120, for example. Of course, one of ordinary skill in the art would understand that a user may use other interfaces to generate the location identification rule 120, such as a source code or pseudocode editor to write code or pseudocode corresponding to the location identification rule 120. In the embodiments described herein, one or more parameters for identifying the LID may be set to a stream descriptor that is defined in the file format for designating a particular stream. Stream descriptors may include special characters (e.g., "<," "#," etc.) and/or a special element (e.g., "<rootStream>," "<cfbStreamEntry>," etc.) that differentiate stream descriptors from content within the electronic document 105. As shown in the location identification rule generation assistant 200, a user may enter (e.g., via a keyboard) in a stream descriptor in a field 202 (e.g., text box) to set the stream descriptor as a parameter for the rule 120, and select (e.g., via a mouse) in a field 204 (e.g., drop down menu) to set the file format in which the stream descriptor may exist as another parameter for the rule 120. By establishing the location identification rule 120 having one or more parameters set to a particular stream descriptor, any routine or process having access to the location identification rule 120 may recognize the set stream descriptor(s) as special indicators or keywords within the file format of the electronic document 105 that designate streams of content in the electronic document 105. The location identification rule 120 may be stored in memory 114 or a database (not shown) communicatively coupled to the platform 110.

The platform 110 may then, via the first routine or application 116 or another dedicated routine or application, use the location identification rule 120 to detect a stream descriptor and extract the text (e.g., character, word) or embedded object located in the stream corresponding to the stream descriptor. Typically, file formats are designed such that the text or object immediately follows the stream descriptor, although embodiments of the present disclosure allow for location identification rules 120 to be modified so that text or object appearing before a stream descriptor may also be extracted, for example. In some embodiments, the one or more parameters of the location identification rule 120 may specify whether the text or object before or after a stream descriptor should be extracted. As shown in the location identification rule generation assistant 200, a user may select (e.g., via a mouse) radio buttons 210 to indicate whether the text or object before or after the stream descriptor should be extracted as a parameter for the rule 120.

The platform 110 may then, via the first routine or application 116 or another dedicated routine or application, generate a stream identifier (SID) as the LID for the extracted text or object in the stream corresponding to the stream descriptor by executing a function (i.e., hash function) using the stream descriptor. Examples of hash function algorithms include a Merkle-Damgård algorithm (e.g., MD5, MD6, or the variants thereof), a Secure Hash Algorithm (e.g., SHA-2, SHA-3, or the variants thereof), SWIFFT, and/or any other suitable hash functions that produce a particular output for a given input. In exemplary embodiments, the SID may be an 8 byte hash, which significantly reduces the odds of a collision over a 4 byte hash for example, in extreme examples. For example, even in the extreme case of a 10,000-page Adobe® PDF document composed of over 60,000 streams of content, an SID that is a 8 byte hash would have a 1 in 10 billion chance of a hash collision. One of ordinary skill in the art will understand that the exact length of the SID is subject to modification based on implementation. The one or more parameters of the location identification rule 120 may specify the particular hash function algorithm used to generate the LID, as well as the representation of the hash (e.g. bytes, number of bytes, hexadecimal, etc.). As shown in the location identification rule generation assistant 200, a user may select (e.g., via a mouse) the particular hash function algorithm in a field 206 to set the particular hash function algorithm as a parameter for the rule 120, and select (e.g., via a mouse) the representation of the hash in a field 208 (e.g., drop down menu) to set the representation of the hash as a parameter for the rule 120.

In some scenarios, using the SID as the LID may be enough to uniquely identify content. For instance, if only an embedded object (e.g. an image) is located in a particular stream of a Microsoft® Word document, the SID may appropriately identify the embedded object. However, in scenarios where the SID identifies a stream of content such as text comprising a plurality of characters or words, it may be desirable to identify a particular content item (e.g., a particular character or particular word among the plurality of characters or words) within the stream. In such scenarios, the LID may also include an offset identifier (OID) in addition to the SID. The OID for a particular content item within a stream may be based on the position of the content item relative to the stream characterized by the SID, or another reference point, such as the beginning stream of the electronic document 105, such as the root stream. The OID may be a 4 byte hash for example, although one of ordinary skill in the art will understand that the exact length of the OID is subject to modification based on implementation. In some embodiments, the one or more parameters of the location identification rule 120 may specify whether the OID is based on the position of the content item relative to the stream that it is in, or another reference point, such as the beginning stream of the electronic document, such as the root stream, as well as the representation of the hash (e.g. bytes, number of bytes, hexadecimal, etc.). As shown in the location identification rule generation assistant 200, a user may select (e.g., via a mouse) radio buttons 212 to indicate whether the OID is based on the position of the content item relative to the stream that it is in, or to a beginning stream of the electronic document, as an offset parameter for the rule 120, and select (e.g., via a mouse) the representation of the OID in a field 214 (e.g., drop down menu) to set the representation of the OID as a parameter for the rule 120. The user may also specify, via radio buttons 218, the representation of the LID when the LID includes both the SID and OID, such as whether the OID is concatenated preceding or following the SID. The SID and OID may also not be concatenated in other embodiments, and remain as separate identifiers associated with each other.

The platform 110 may then assign each LID (i.e., SID, OID, or both) with each stream or particular content item within the stream of the electronic document, and store LID index data to log such assignments, which may be in the form of a reference file (e.g., an index file or a look-up relation table), in memory 114 or a database (not shown) communicatively coupled to the platform 110.

Figure 3:
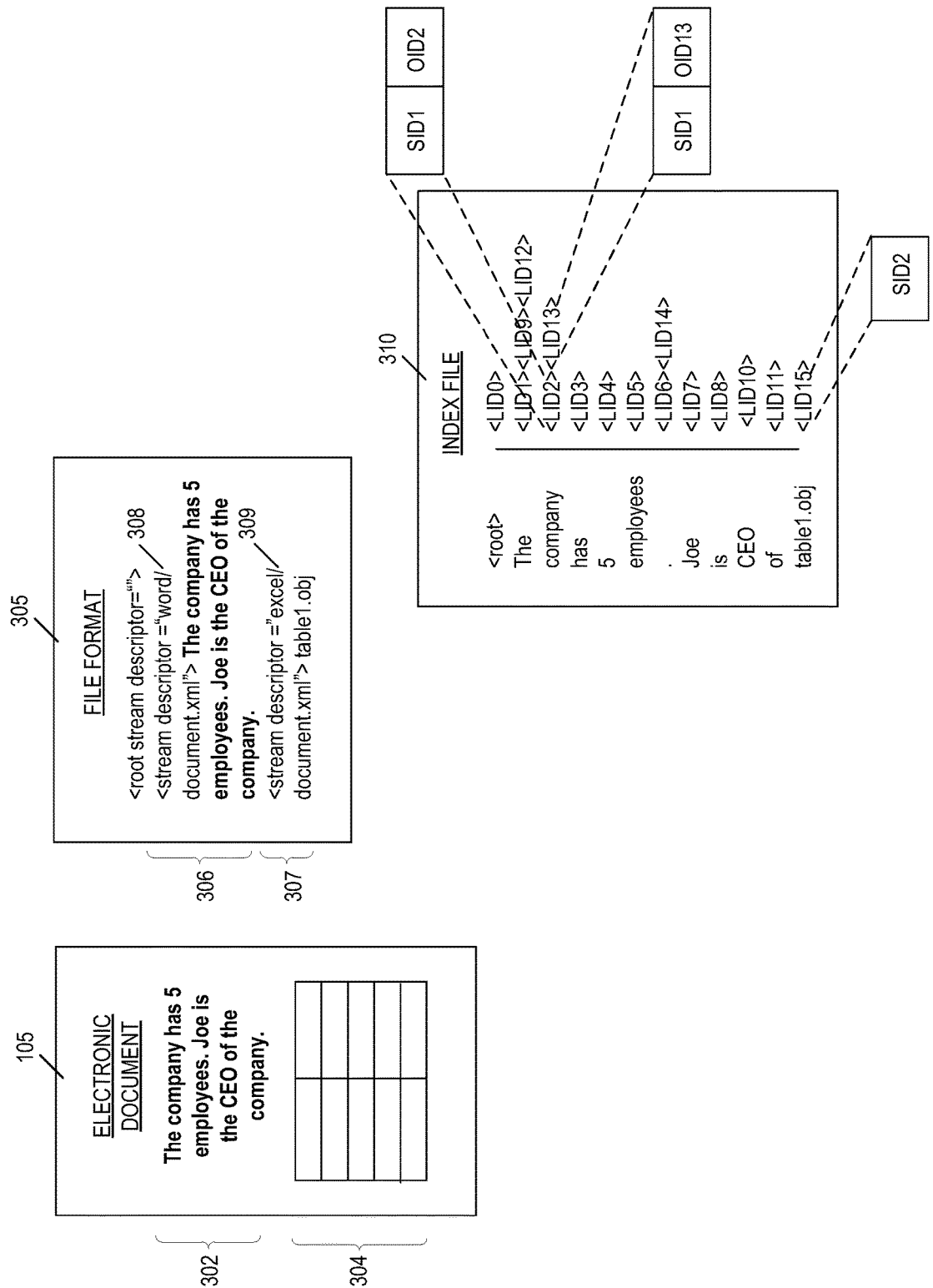
FIG. 3 depicts an example electronic document and the corresponding location identifiers for the electronic document therein, according to one embodiment and scenario.

Turning now to FIG. 3, an example file format 305 underlying electronic document 105 is shown depicting several non-limiting stream descriptors. As will be shown in greater detail below, the platform 110 may generate and assign LIDs to content and/or content items within an electronic document 105 based on the stream descriptors, and the LIDs may be stored in an index file 310. The index file 310 may enable any routine or application having access to the index file 310 to have random access to the records of the content or content items contained therein given the LID. The LID may be viewed as an index file key that uniquely identifies a record of the content or content items contained in the index file 310.

The electronic document 105 (e.g., a Microsoft® Word document) may comprise a text portion 302 and/or an object portion 304. Starting with the top portion of the electronic document 105, the text portion 302 may include a series of characters, such as letters, numbers, punctuation marks, etc. The object portion 304 may include an embedded file or object, such as a table from Microsoft® Excel. An example file format 305 underlying electronic document 105 may include a root stream designated as <root stream descriptor=" "> corresponding to the top portion of the electronic document 105, and nested streams 306, 307 designated as <stream descriptor="word/document.xml"> (hereinafter "stream descriptor 308") and <stream descriptor="excel/document.xml"> (hereinafter "stream descriptor 309"), respectively, corresponding to portions 302, 304 of the electronic document 105, respectively. Accordingly, in this particular example, only three streams (i.e., the root stream, stream 306, and stream 307) are illustrated, although one of ordinary skill in the art will understand that the electronic document 105 as described herein may contain any number of streams.

To generate a LID for the first instance of the word "company," which is the second word in the stream 306 designated with stream descriptor 308, the platform 110, via first routine 116, may input the stream descriptor 308 into a hash function, thereby performing a hash function on the stream descriptor 308, to generate the SID. In one example, the hash function may generate an output representative of the SID that truncates to 8 bytes (e.g., "ecf8427e"). The SIDs for all the other words in the stream 306, such as "Joe" and "CEO," are the same (e.g., "ecf8427e") because the words are located in the same stream 306 corresponding to stream descriptor 308. Therefore, to distinguish the location of the word "company" with another word like "CEO," the platform 110, via first routine 116, may calculate an offset relative to a reference point established by the location identifier rule 120, such as the beginning of the stream 306. For example, if the platform 110, via first routine 116, determines that the word "company" is offset by 1 word relative to the beginning of the stream 306 that begins with the word "The," the OID may correspond to 1. As another example, if the platform 110 determines that the word "company" is offset by 4 characters (i.e., the letters "T," "h," "e," and space), the OID may correspond to 4. In any event, the LID for the word "company" in this example may be the concatenation of the SID (e.g., resulting 8 byte hash of the stream descriptor 308) and the OID (e.g., resulting 4 byte representation of 1 word or 4 characters). The resulting LID, depicted as <LID2>, may be stored in the index file 310 in a table corresponding to the word "company." As the index file 310 may store thousands of LIDs, the platform 110 may append an appropriate delimiter to the LID to separate different LIDs from each other, in some embodiments.

As shown in the index file 310, the word "company" is associated with two LIDs, <LID2> as discussed above, and <LID13>. <LID13> is the result of the second occurrence of the word "company" in the stream 306. <LID13> includes the same SID (i.e., SID1) as <LID2>, but its OID (i.e., OID13) would be different than the OID of <LID2> (i.e., OID2). The OID of <LID13> may correspond to the resulting 4 byte representation of 11 words (i.e., the second occurrence of "company" is the 11$^{th}$ word after the first word, "The") or 55 characters (i.e., the second occurrence of "company" begins at the 55$^{th}$ character after the first character, "T", where a space and punctuation mark such as the period each counts as one character).

As another example, to generate a LID for the object portion 304 that may include an embedded file or object, such as a table from Microsoft® Excel designated with stream descriptor 309, the platform 110, via first routine 116, may perform a hash function on the stream descriptor 309 to generate the SID. In contrast to generating <LID2> or <LID13> for the word "company" described above, there are no other text or embedded objects or files in stream 304. Therefore, because the Microsoft® Excel table need not be distinguish from any other object, file, or text, generation of only the SID may be necessary. Accordingly, the LID for the Microsoft® Excel table in this example may simply be the SID (i.e., SID2). In other embodiments, the LID for the Microsoft® Excel table may include an OID representative of the offset location of the Microsoft® Excel table with respect to the beginning of the document. For example, the OID may correspond to the resulting 4 byte representation of 12 item (i.e., the Microsoft® Excel table is the 12$^{th}$ content item after the first word, "The"). In any event, the resulting LID, depicted as <LID15>, may be stored in the index file 310. SID2 in this example is different than SID1 because the stream descriptor corresponding to stream 306 that includes text is different than the stream descriptor corresponding to the stream 307 that includes the Microsoft® Excel table.

Although index file 310 is shown as primarily illustrating a LID for each and every word within the text portion 302, it should be contemplated that the index file 310 may alternatively or additionally store a LID for each and every character (i.e., letter). It is noted that LID4, and LID6 and LID7 are associated with characters, such as a number (i.e., "5") and punctuation mark (e.g., "."), respectively.

It should also be appreciated that for file formats (e.g., file format 305) defined to begin with a root stream, the platform 110, via first routine 116, may input the stream descriptor of the root stream (e.g., " " as shown in 305) into a hash function to generate the SID as the <LID0> corresponding to the root stream descriptor, which may also be stored in the index file 310. Because the default root stream may remain unmodified, the output of any subsequent hash function for the root stream truncates to the same SID.

The platform 110, via first routine 116, may generally continue to generate LIDs in this manner until each text and embedded object within the electronic document 105 is assigned a LID. If the electronic document 105 is modified (e.g., words have been added or deleted from the original electronic document), the platform 110 may update its LIDs, since the SID or OID may have changed. In some embodiments, the platform 110 need not update every LID generated. For instance, if the modification of the electronic document 105 occurs starting from the last stream of the electronic document, the platform 110 may only need to update LIDs for content items located in the last stream of the electronic document, and therefore may maintain the generated LIDs for the streams prior to the last stream. Therefore, the platform 110, via the first routine 116, may flag the last stream as being a modified stream, and proceed to generating the LID for the flagged stream in the manners described herein.

For an electronic document 105 having a large amount of content within a stream (e.g., several sentences, several images, etc.), the platform 110, via first routine 116, may index the electronic document 105 (e.g., the LIDs may be indexed in an index file for example) to advantageously facilitate efficient and fast look up of the LIDs by any routine or application having access to the index file. As will be described in more detail below, the platform 110 or remote platform 130 may then, via second routine 118, perform a certain review action (e.g., redacting or highlighting a desired word and/or object) by locating the desired word and/or object by its assigned LID. In some embodiments, the platform 110 and/or platform 130 may include an electronic document review (EDR) interface that enables or assists one or more reviewers to search through the electronic document 105 to determine whether or not the electronic document 105 includes any information relevant to the discovery process that may need to be redacted or highlighted, for example.

III. Example Methods for Locating Content within an Electronic Document Based on Location Identifiers (LID)

Figure 4:
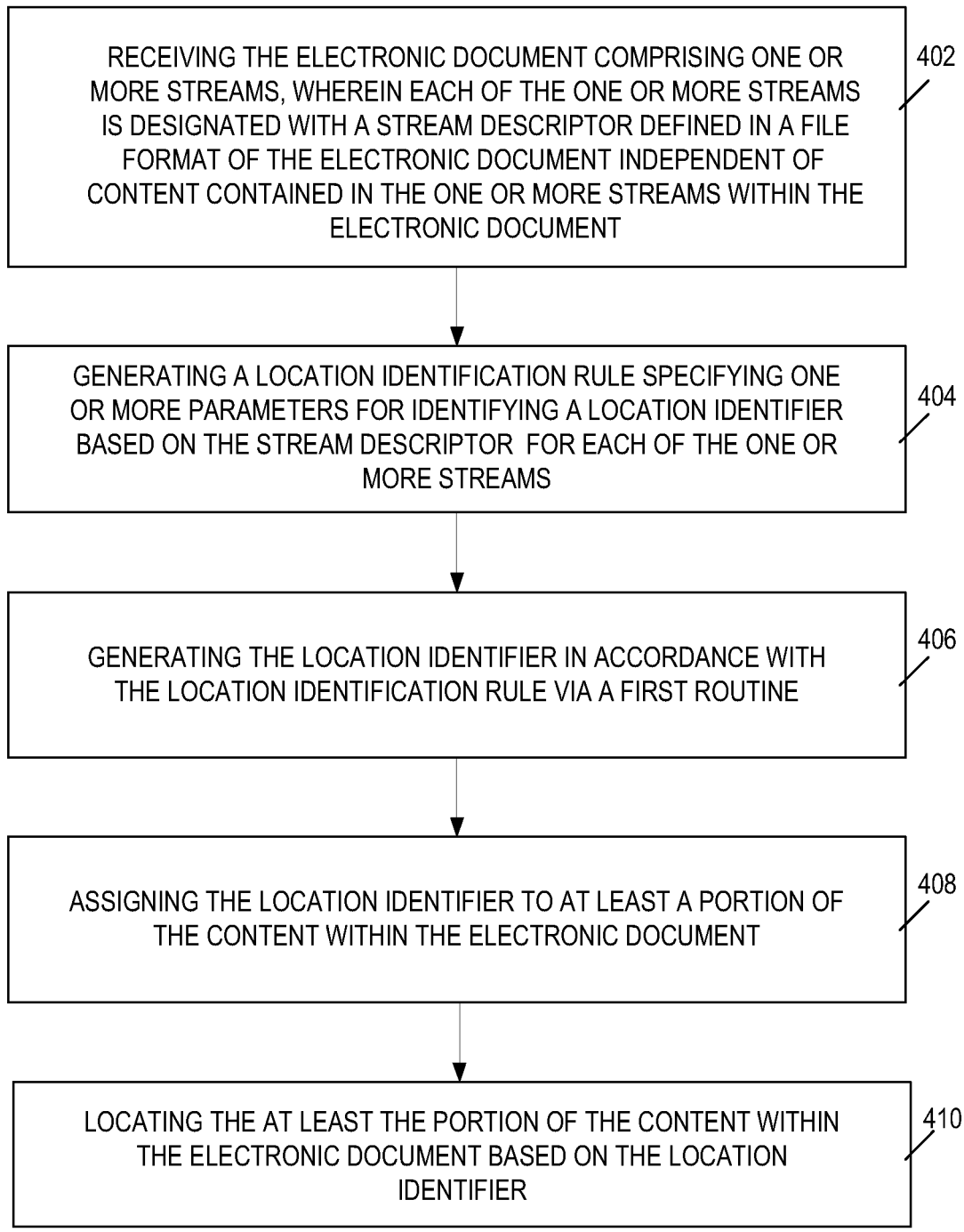
FIG. 4 depicts a flow diagram of an example method for locating content or content items within an electronic document based on location identifiers, according to one embodiment.

FIG. 4 depicts a flow diagram of an example method 400 for locating content or content items within an electronic document based on LIDs, according to one embodiment. The method 400 may be implemented by one or more processors of one or more computing devices, such as the platform 110 and/or remote platform 130 of FIG. 1, for example.

The method 400 may begin when the platform 110 receives or otherwise accesses the electronic document, such as the electronic document 105 containing stream(s) of content as shown in FIG. 3 (block 402). The stream(s) may be designated with a stream descriptor defined in a file format of the electronic document 105 independent of the content items contained in the stream(s) within the electronic document. To this end, a user may first interact with a computer program (e.g., first routine 116) to provide the platform 110 access to the electronic document 105. The computer program may execute entirely on the platform 110 and/or be accessible via a web browser executing on a client device communicatively coupled to the platform 110, for example. In one scenario, the electronic document 105 is stored at a location already accessible by the platform 110.

In this scenario, the computer program may enable the user to provide the location (e.g., a directory, a drive, a memory block) where the electronic document 105 currently resides. Accordingly, the platform 110 may access the electronic document 105 at the user-provided location. In another scenario, the user may interact with the computer program to upload or otherwise copy the electronic document 105 to the platform 110. In this scenario, the platform 110 may store and access the electronic document 105 at a location and/or workspace specifically optimized for generating LIDs for content within the electronic document 105 and/or locating content or content items by their assigned LIDs for further processing, such as redacting or highlighting the content or content items.

After receiving or otherwise accessing the electronic document 105, the platform 110 may begin generating a location identification rule specifying one or more parameters for identifying the LID based on the stream descriptor for each of the content items contained in the one or more streams (block 404). This generation of the location identification rule may occur in a similar manner as described above with respect to FIG. 2. As described herein, a user may interact with a computer program (e.g., first routine 116) to generate the location identification rule and provide the platform 110 access to the location identification rule. One or more parameters specified by the location identification rule may be set to a stream descriptor that is defined in the file format underlying the electronic document 105 for designating a particular stream. By establishing the location identification rule having one or more parameters set to a particular stream descriptor, a particular hash function, a particular representation for the SID of the LID, and/or any offset parameter and representation, any routine or process having access to the location identification rule 120 may (1) recognize or detect the set stream descriptors as special indicators or keywords within the file format of the electronic document 105 that designate streams of content in the electronic document 105; (2) extract the content of the stream designated by the stream descriptor immediately preceding or following the stream descriptor; (3) use the stream descriptor as an input of a hash function to generate the SID for the stream designated by the stream descriptor; and/or (4) for identification of a particular content item within a stream, calculate an offset with respect to the offset setting of the location identification rule 120 to generate the OID for the content item.

After generating the location identification rule, the platform 110 may begin generating the LID(s) in accordance with the location identification rule via a first routine 116 described in FIG. 1 (block 406). The LID(s) or the location identification rule may be sharable with a second routine 118, so that the second routine may either determine LIDs on its own without assistance from the first routine using the location identification rule, or recognize and properly interpret the LIDs determined by the first routine. This generation of the LID(s) may occur in a similar manner as described above with respect to FIG. 3. The step at block 406 may be performed in parallel for different portions of the electronic document 105. For example, the platform may contain any number of parallel processing units, including units at a processor level (e.g., a multicore processor or a GPU/CPU arrangement), and/or units at a server level via cloud computing techniques. Accordingly, in processing a corpus of electronic documents, the platform 110 may divide the corpus into a plurality of subsets of electronic documents that are processed in parallel by the parallel processing units. Similarly, in processing electronic document 105 alone, the platform 110 may divide the electronic document 105 into a plurality of subsets (e.g., according to context level) of the electronic document 105 that are processed in parallel by the parallel processing units. Although the description of the steps performed by platform 110 generally refer to the processors of the platform 110 acting upon the electronic document 105, it should be appreciated that in implementations that utilize these parallel processing techniques, any particular processing unit of the platform 110 may act upon the electronic document 105 or a corpus of electronic documents.

To generate the LID, the first routine 116 may at least generate a SID as the LID for the extracted content by executing a function (i.e., hash function) using the stream descriptor corresponding to the extracted text or object. A single piece of text (e.g., a single character, a single word) or object (e.g., a single image, a single video file) in a single stream may only necessitate an SID as the LID. The first routine 116 may also generate an OID, where the SID and OID may collectively be the LID. Multiple pieces of text (e.g., multiple characters, multiple words) or objects (e.g., multiple images of video files) in a single stream may necessitate an OID to differentiate one piece of text from another piece of text in the stream, for example. As such, the OID for a particular content item may be based on the position of the content item relative to the stream that it is in, or to the beginning stream of the electronic document, such as the root stream. Accordingly, each electronic document may be associated with LID(s) based on at least the truncated output of the hash function for the stream descriptor corresponding to the stream therein, and in some embodiments, based on the offset position of a particular content item within the same stream.

After generating the LID, the platform 110 may begin assigning the LID to at least a portion of the content (i.e., content item) within the electronic document, as shown in block 408. Assigning LID(s) to the content or content item may occur in a similar manner as described above with respect to FIG. 3. In some embodiments, the first routine 116 described in the step at block 406 may be configured to assign the LID to the content or content item. In other embodiments, another routine different from the first routine 116 may be dedicated to the assignment function. Nevertheless, the platform 110 may assign each LID (i.e., SID, OID, or both) with content in each stream or particular content item within the stream of the electronic document, and store LID index data to log such assignments, which may be in the form of an index file or a look-up relation table, for example.

After generating the LID and assigning the LID to the content or to a portion of the content (i.e., content item) within electronic document 105, the platform 110 may then locate the at least the portion of the content within the electronic document 105 based on the LID (block 410) via the first routine 116 or the second routine 118. In some embodiments, the first routine 116 (i.e., the same routine configured to generate the LID) may locate the content or portion of the content within the electronic document 105 based on the LID. In other embodiments, another routine, such as a second routine 118, may locate the content or portion of the content within the electronic document 105 based on the LID, as will be shown with respect to FIG. 5.

Figure 5:
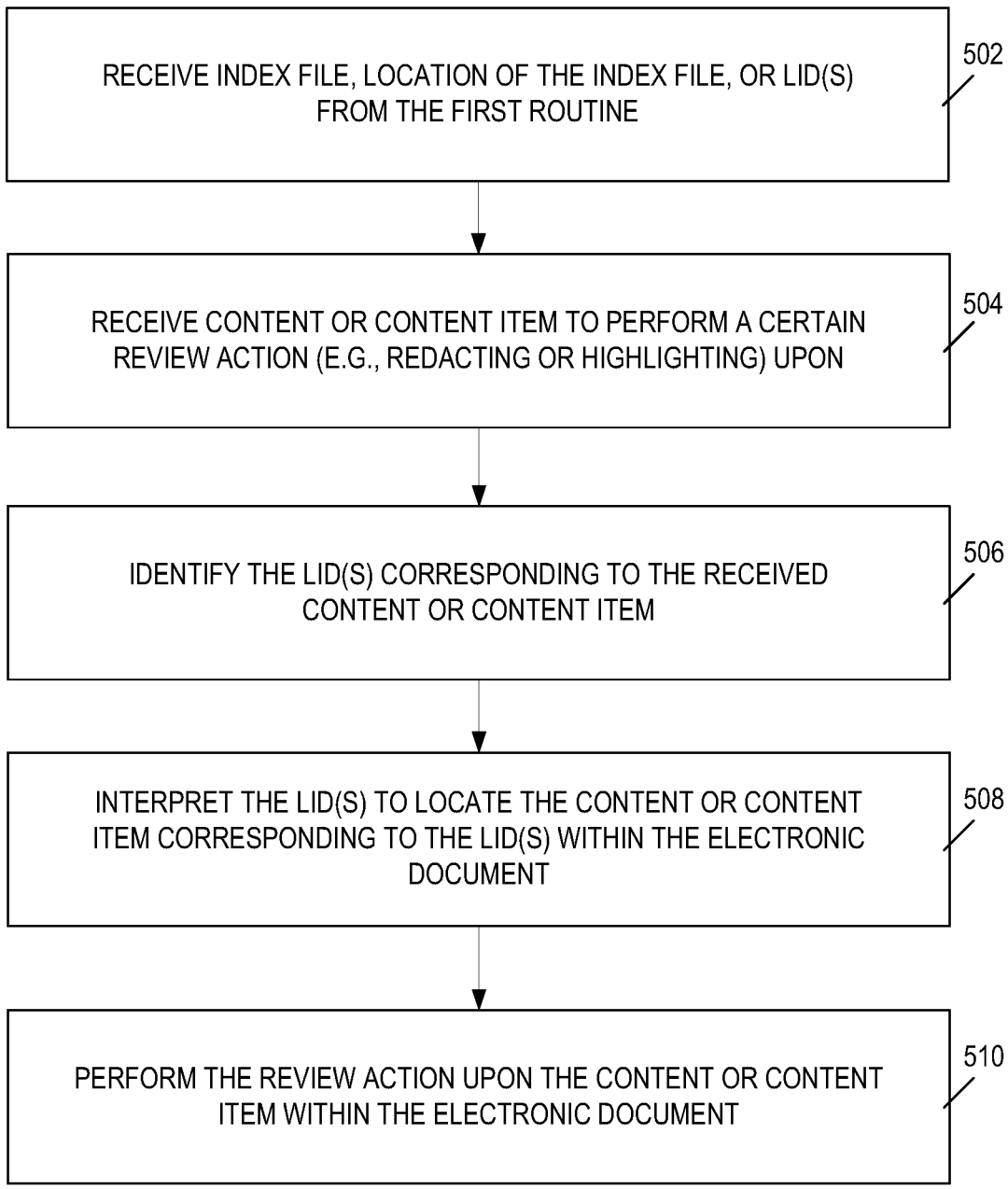
FIG. 5 depicts another flow diagram of an example method for locating content or content items within an electronic document based on location identifiers, according to one embodiment.

FIG. 5 depicts a flow diagram of an example method 500 for locating content or content items within an electronic document based on LIDs, according to one embodiment. The method 500 may be implemented by one or more processors of one or more computing devices, such as the platform 110 of FIG. 1, for example, or another platform (e.g., platform 130) communicatively coupled to the platform 110 via a network 125, in accordance with a second routine 118. The second routine 118 may be configured to receive the LID from the first routine 116, or otherwise receive the location of the index file 310 or the index file 310 itself to subsequently locate content or content item based on the LID stored in the index file 310 (block 502). The second routine 118 may be a routine of the same application carried out by the platform 110 that initiates the first routine 116, or may be a routine of a different application carried out by the platform 110 or even a different platform 130 than the one that initiates the first routine 116.

In the event that the second routine 118 is carried out by a different platform (i.e., remote platform 118), platform 110 may export the LIDs to the remote platform 118 for use by the remote platform 118. In some embodiments, the export may transmit a location at which the LIDs are stored, such as the location of the index file 310, so that the remote platform 118 may have access to the index file 310. In other embodiments, the export may transmit the index file 310 itself. The export may additionally communicate the location identification identifier rule(s) to the remote platform 118 to enable the remote platform 118 to understand the representation of the LID so that the remote platform 118 may be capable of using the LID to locate the corresponding content or content items tied to the LID.

In any event, the second routine 118 may receive content or a content item to perform a certain review action (e.g., redacting or highlighting) upon (block 504). For example, a user, may interact with an electronic document review (EDR) interface (e.g., web-based viewer) tied to the second routine 118 to select the content or content item. In response to receiving the content or content item, the second routine 118 may use the index file 310 or LIDs received from the first routine 116 or otherwise have access to the index file 310 or LIDs to identify the LID(s) corresponding to the received content or content item (block 506). Upon identifying the content or content item by its corresponding LID(s), the second routine 118 may proceed to interpreting the LID(s) to locate the content or content item corresponding to the LID(s) within the electronic document 105 (block 508). To do so, the second routine 118 may receive the location identification identifier rule 120 from the first routine 116 or otherwise have access to the location identification identifier rule 120 to properly interpret the meaning of the LID(s).

For example, receiving the location identification identifier rule 120 depicted in FIG. 2 would indicate to the second routine 118 that the first 8 bytes of the LID represents a SHA-3 hash of a stream descriptor, and the last 4 bytes of the LID represents an offset within the stream corresponding to the stream descriptor. The second routine 118 may then generate LIDs for the electronic document 105 based on the received location identification identifier rule 120 in a manner described with respect to the first routine 116, and upon generating the LID that matches (i.e., is identical to) the LID received from the first routine 116, locate the content or content item corresponding to the matched LID within the electronic document 105.

As another example, rather than the second routine 118 undergoing the process of generating LIDs for the electronic document 105 based on the received location identification identifier rule 120 in a manner described with respect to the first routine 116, the second routine 118 may receive or otherwise have access to a reference file, such as a stream log file, that logs the steps taken by the first routine 116 when generating the LIDs. The stream log file, which may represent a schema (e.g., XML schema) describing a file format such as the Office Open XML described herein, may be created by the first routine 116 and stored in memory 114. Upon having access to the stream log file, when the second routine 118 receives or otherwise has access to the LID generated by the first routine 116, the second routine 118 may be configured to parse the stream log file to find the LID, and further analyze the section of the stream log file corresponding to the LID to find the desired content corresponding to the LID. For example, when the LID is a SID (e.g., SID2) describing an embedded object or file, the stream log file may contain the name of the object or file (e.g., table1.obj) and an indicator that the object or file corresponds to LID15 (i.e., SID2) as shown in FIG. 3. Therefore, because the second routine 118 is configured to parse the stream log file to recognize that SID2 corresponds to "table1.obj", the second routine 118 need not expend processing resources to generate all LIDs (e.g., LIDs corresponding to streams 306), and may simply identify "table1.obj" as corresponding to SID2 based on the stream log file.

In some embodiments, the stream log file may alternatively or additionally be configured to contain a stream of text and an indicator that the stream of text corresponds to LIDs, so that the second routine 118 may parse the stream log file to recognize LIDs corresponding to the stream of text. Because streams of text may be compressed, encrypted, or otherwise encoded, the stream log file may also contain decoding filters describing a defined decoding algorithm, so that the second routine 118 may decrypt the encrypted streams of text and subsequently recognize LIDs corresponding to the decrypted streams of text.

Accordingly, both the first routine 116 and the second routine 118 may be viewed as routines that have the same algorithm for defining each LID, as described in the location identification identifier rule. Therefore, and advantageously, the first routine 116 and second routine 118 as described herein can be the same or different independent pieces of code in different programming languages (e.g., C#, JAVA, C++, etc.) that each understand how to commonly define LIDs based on the location identification identifier rule that are accessible by each of the first and second routines.

Subsequently, the second routine 118 may perform a certain review action (e.g., redacting or highlighting) on the content or content item corresponding to the matched LID or LID identified from the stream log file within the electronic document (block 508).

As an example implementation, a user may interact with an electronic document review (EDR) interface (e.g., web-based viewer) tied to the second routine 118 configured to locate the content or portion of the content to assist in searching through the electronic document 105 to determine whether or not the electronic document 105 includes any information relevant to the discovery process that may need to be redacted. The second routine 118 may be an HTML5 conversion routine that converts the received electronic document 105 into an HTML5 rendition of the electronic document so that the web-based viewer may display the electronic document that resembles the actual electronic document 105 produced by a native application. The second routine 118 may also perform an optical character recognition (OCR) technique, or similar type of extracting technique, on the electronic document to identify and extract any machine-encoded content that may be included in the electronic document. Upon a user entering (e.g., via a keyboard) in a character, word, or other content or content item to be redacted into a search box of the web-based viewer, the second routine 118 may identify the LID(s) corresponding to the word by accessing the index file 310 and subsequently use the LID(s) to locate and redact the desired word within the electronic document 105. The second routine 118 may either interpret the meaning of the LID based on the location identification identifier rule used by the first routine 116 to generate the LID, or based on a stream log file that logs the steps taken by the first routine 116 when generating the LIDs. Upon proper interpretation of the LID, the second routine 118 may be configured to display, via the web-based viewer, the redaction of the content or content item on the HTML5 rendition of the electronic document.

IV. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for identifying and grouping likely textual near-duplicates through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method of identifying a location of content within an electronic document, the method comprising:
   receiving, by one or more processors, the electronic document comprising one or more streams, wherein each of the one or more streams is designated with a stream descriptor defined in a file format of the electronic document independent of content items contained in the one or more streams within the electronic document;
   generating, by the one or more processors, a location identification rule specifying one or more parameters for identifying a location identifier based on the stream descriptor for each of the content items contained in the one or more streams;
   generating, by the one or more processors, the location identifier in accordance with the location identification rule via a first routine, wherein the location identifier or the location identification rule is sharable with a second routine;
   assigning, by the one or more processors, the location identifier to at least one of the plurality of content items contained in the one or more streams within the electronic document; and
   locating, by the one or more processors via the first routine or the second routine, the at least one of the plurality of content items based on the location identifier.

2. The computer-implemented method of claim 1, wherein the location identifier comprises a stream identifier, wherein the stream identifier is derived from an output of a hash function of the stream descriptor.

3. The computer-implemented method of claim 2, wherein the location identifier comprises an offset identifier, wherein the offset identifier corresponds to the at least one of the plurality of content items within the one or more streams.

4. The computer-implemented method of claim 1, further comprising:
   generating, by the one or more processors, a reference file associated with the electronic document in accordance with the location identification rule, wherein the reference file comprises the location identifier corresponding to the at least one of the plurality of content items within the electronic document; and
   locating, by the one or more processors, the at least one of the plurality of content items within the electronic document using the reference file.

5. The computer-implemented method of claim 4, wherein the reference file comprises an index file that includes a correlation list between the at least one of the plurality of content items and the location identifier configured to be updatable in response to a modification of the electronic document.

6. The computer-implemented method of claim 4, wherein the reference file comprises a stream log file for tracking the identified stream descriptor and the location identifier for each of the one or more streams in accordance with a schema.

7. The computer-implemented method of claim 4, further comprising:
marking, by the one or more processors, the at least one of the plurality of content items within the electronic document based on the location identifier via the second routine in accordance with the location identification rule.

8. The computer-implemented method of claim 7, further comprising:
receiving, by the one or more processors, the location identification rule via the second routine;
generating, by the one or more processors, the location identifier in accordance with the location identification rule; and
marking, by the one or more processors, the at least one of the plurality of content items within the electronic document corresponding to the location identifier.

9. The computer-implemented method of claim 7, further comprising:
receiving, by the one or more processors, the location identification rule via the second routine;
identifying, by the one or more processors, the location identifier in accordance with the reference file; and
marking, by the one or more processors, the at least one of the plurality of content items within the electronic document corresponding to the identified location identifier.

10. The computer-implemented method of claim 7, further comprising:
receiving, by the one or more processors, the location identification rule via the second routine;
receiving, by the one or more processors, the location identifier generated via the first routine; and
marking, by the one or more processors, the at least one of the plurality of content items within the electronic document corresponding to the location identifier in accordance with the location identification rule.

11. A system for identifying a location of content within an electronic document, the system comprising:
a memory unit configured to store a first routine; and
a processor configured to, upon execution of the first routine:
receive the electronic document comprising one or more streams, wherein each of the one or more streams is designated with a stream descriptor defined in a file format of the electronic document independent of content items contained in the one or more streams within the electronic document;
generate a location identification rule specifying one or more parameters for identifying a location identifier based on the stream descriptor for each of the content items contained in the one or more streams;
generate the location identifier in accordance with the location identification rule via a first routine, wherein the location identifier or the location identification rule is sharable with a second routine;
assign the location identifier to at least one of the plurality of content items contained in the one or more streams within the electronic document; and
locate via the first routine or the second routine the at least one of the plurality of content items based on the location identifier.

12. The system of claim 11, wherein the location identifier comprises a stream identifier, wherein the stream identifier is derived from an output of a hash function of the stream descriptor.

13. The system of claim 12, wherein the location identifier comprises an offset identifier, wherein the offset identifier corresponds to the at least one of the plurality of content items within the one or more streams.

14. The system of claim 11, wherein the processor, upon execution of the first routine, is further configured to:
generate, a reference file associated with the electronic document in accordance with the location identification rule, wherein the reference file comprises the location identifier corresponding to the at least one of the plurality of content items within the electronic document; and
locate the at least one of the plurality of content items within the electronic document using the reference file.

15. The system of claim 14, wherein the reference file comprises an index file that includes a correlation list between the at least one of the plurality of content items and the location identifier configured to be updatable in response to a modification of the electronic document.

16. The system of claim 14, wherein the reference file comprises a stream log file for tracking the identified stream descriptor and the location identifier for each of the one or more streams in accordance with a schema.

17. The system of claim 14, further comprising:
a second processor configured to, upon execution of the second routine, mark the at least one of the plurality of content items within the electronic document based on the location identifier via the second routine in accordance with the location identification rule.

18. The system of claim 17, wherein the second processor, upon execution of the second routine, is further configured to:
receive the location identification rule;
generate the location identifier in accordance with the location identification rule; and
mark the at least one of the plurality of content items within the electronic document corresponding to the location identifier.

19. The system of claim 17, wherein the second processor, upon execution of the second routine, is further configured to:
receive the location identification rule;
identify the location identifier in accordance with the reference file; and
mark the at least one of the plurality of content items within the electronic document corresponding to the identified location identifier.

20. The system of claim 17, wherein the second processor, upon execution of the second routine, is further configured to:
receive the location identification rule;
receive the location identifier generated via the first routine; and
mark the at least one of the plurality of content items within the electronic document corresponding to the location identifier in accordance with the location identification rule.

* * * * *